Sept. 8, 1953      D. B. KATES      2,651,095
HOSE CLAMP
Filed Oct. 1, 1951
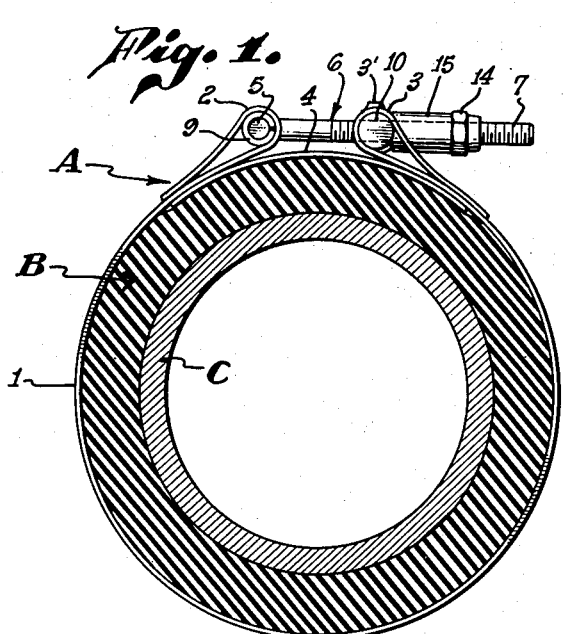
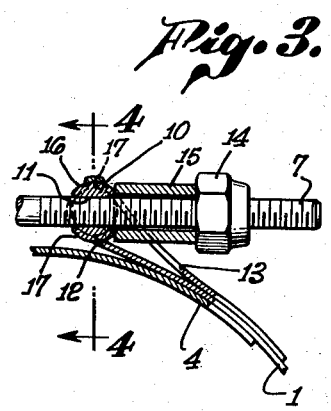
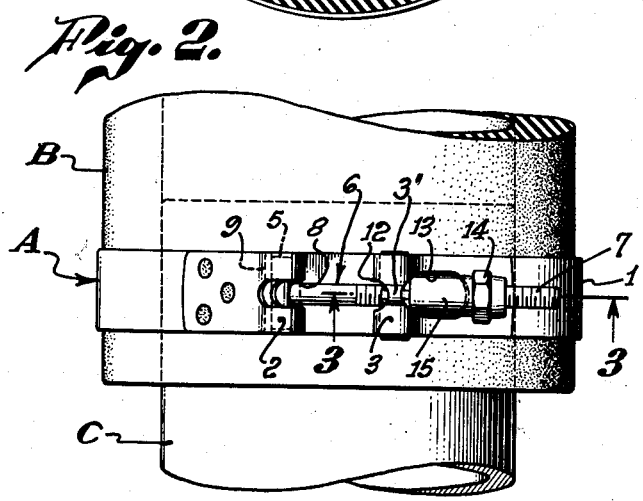
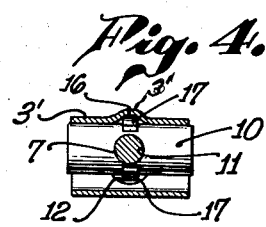
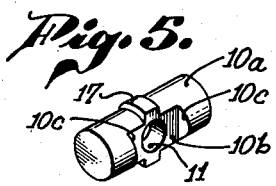
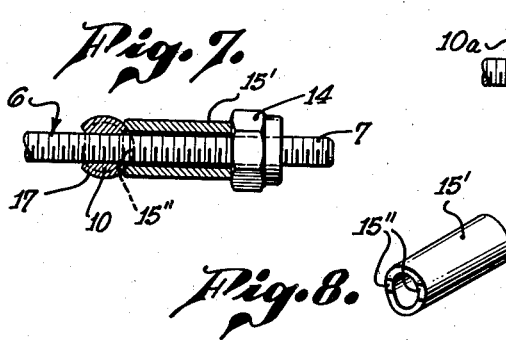
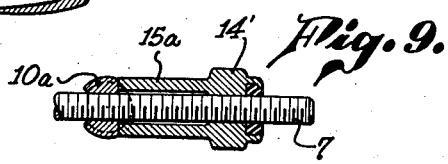
INVENTOR.
DON B. KATES,
BY
Paul A. Weilein
ATTORNEY.

Patented Sept. 8, 1953

2,651,095

UNITED STATES PATENT OFFICE 2,651,095

HOSE CLAMP

Don B. Kates, Los Angeles, Calif.

Application October 1, 1951, Serial No. 249,039

5 Claims. (Cl. 24—279)

This invention relates to hose clamps, and more particularly the type approved for use in aircraft.

It is an object of this invention to provide a hose clamp of the character described which is improved as to strength, durability, reliability of performance and the provision for being tightly clamped and released without distorting or damaging any part thereof or the hose.

It is another object of this invention to provide a clamp such as described wherein a loop on a hose embracing band and a trunnion in the loop for slidably accommodating a bolt, embody interengaged means to restrain axial movement of the trunnion and permit relative turning movement between the loop and the trunnion in a manner assuring the application, tightening and release of the clamp without damaging the parts thereof or the hose.

It is another object of this invention to provide a hose clamp such as described wherein the loop supporting the trunnion permits of the interposition of a tubular spacer on the shank of the bolt between the nut and the trunnion with the spacer and trunnion interengaged in a manner assuring an efficient clamping and releasing action without likelihood of distorting and damaging any part of the clamp or the hose.

This invention possesses many other advantages, and has other objects which may be made more easily apparent from a consideration of several embodiments of the invention. For this purpose, there are shown a number of forms in the drawings accompanying and forming part of the present specification. These forms, which illustrate the general principles of the invention, will now be described in detail; but it is to be understood that this detailed description is not to be taken in a limiting sense, since the scope of the invention is best defined by the appended claims.

In the accompanying drawings:

Fig. 1 is an elevational view of a clamp embodying the present invention, as it would appear when clamping a hose on a conduit;

Fig. 2 is a top plan view of the clamp as shown in Fig. 1;

Fig. 3 is a fragmentary sectional view taken on the line 3—3 of Fig. 2;

Fig. 4 is a sectional view taken on the line 4—4 of Fig. 3;

Fig. 5 is a perspective view of a modified form of trunnion member forming a part of the clamp of this invention;

Fig. 6 is a perspective view of the modified trunnion member looking at the side thereof opposite that shown in Fig. 5;

Fig. 7 is a longitudinal sectional view of another modified form of this invention;

Fig. 8 is a perspective view of the modified form of spacer tube shown in Fig. 8; and Fig. 9 is a longitudinal sectional view of another modified form of the invention.

Figs. 1 and 2 show a hose clamp A made in accordance with this invention, as clamping a hose B on a conduit or fitting C, to illustrate a typical use of the clamp.

The clamp A includes a flexible metal band 1 having loop members 2 and 3 formed on the ends thereof and provided with an extension 4. This extension is welded to the inner surface of one end portion of the band and is adapted to slide between the hose and the other end portion of the band to bridge the gap between the loop members 2 and 3, as shown in Fig. 1.

The head 5 of a T-bolt 6 is pivotally mounted in the loop member 2, with the shank 7 of the bolt extended through an elongated opening or slot 8 in this loop member. A tubular bushing 9 may be mounted on the head 5 to serve as a bearing therefor cooperable with the inner surface of the loop member 2.

Mounted to turn about its axis in the loop member 3 is a solid and generally cylindrical trunnion member 10 having an opening 11 extended transversely therethrough to accommodate the shank of the T-bolt, there being aligned elongated openings or slots 12 and 13 in the loop member, through which the shank 7 extends.

In making the clamp, the ends of the band are bent around the head 5 and trunnion member 10 respectively, then spot welded to the band proper, thereby forming the loop members 2 and 3 with the head 5 and trunnion member 10 mounted therein.

The present invention relates more particularly to the construction and relative arrangement of the loop member 3, the trunnion member 10, a nut 14 operable on the bolt, and tubular spacer 15 between the nut and the trunnion member.

Thus, the trunnion member 10 and loop member 3 are formed to provide cooperable means for restraining axial movement of the trunnion member in the loop member and permitting relative turning movement between the loop member and the trunnion member. This relative turning movement and the pivotal or swinging movement permitted the T-bolt 6 are essential to provide for a ready alignment of the parts of the clamp in the application thereof to a hose and on the tightening of the clamp, as without this movement parts of the clamp might become distorted or damaged in forcing them into the relative positions necessary to apply and tighten the clamp.

As here shown the trunnion member 10 and loop member 3 have interengaged portions to restrain axial movement of the trunnion member and permit relative turning movement between the loop member and the trunnion member. Accordingly, in one form of this invention, the loop member 3 is formed in the web portions 3' thereof between the slots 12 and 13, with an indentation or groove 16 in which is slidably engaged one of a pair of projections or ribs 17 formed on opposite sides of the trunnion member 10. The other rib 17 of the pair of ribs extends as shown in Fig. 3 into the slot 12. However, it is obvious that the ribs could be formed on the loop and the grooves or slots in the trunnion. The ribs 17 will move freely in the groove 16 and slot 12 when the trunnion member 10 is turned about its axis, but in cooperation with the groove and said slot will prevent dislodgement of trunnion member from the loop member 3 in all positions of the trunnion member.

The inner end of the tubular spacer 15 extends freely through the slot 13 in the loop member 3 and abuts the trunnion member 10. Thus, as the nut 14 is tightened against the outer end of the spacer 15, the clamping force is evenly applied to the loop members 2 and 3 by means of the bolt head 5 and the trunnion member 10 respectively, without the likelihood of distorting and damaging the loops or the band or damaging the protective coating or plating usually applied to the band and loops.

As shown in Figs. 5 and 6, a trunnion 10a may be used in place of the trunnion 10, the trunnion 10a having a flat bearing surface 10b for the tubular spacer. This flat surface may be formed by notching or recessing the trunnion member in a manner providing a pair of spaced shoulders 10c between which the inner end of the spacer will be disposed when the band is clamped on a hose. Should the interengaging means between the trunnion member and loop member become damaged or otherwise fail in its purpose, the shoulders 10c will abut the spacer and prevent axial displacement of the trunnion member.

In having the trunnion member 10 and loop member 3 interengaged as here provided, not only is the trunnion member restrained against axial movement and permitted turning movement, but a more intimate contact of the parts is provided, assuring that the forces transmitting from the trunnion member to the loop members and band will not tend to distort or damage the loop members and the band or damage the coatings thereon.

Moreover, in providing the spacer 15 as a separate part which is freely inserted through the slot 13 so as to contact the trunnion member without being required to contact the loop member 3, no forces are applied to the loop members which would tend to distort or damage the clamp.

It should be noted that in having the two opposed openings or slots 12 and 13 separated by the web portion 3' of the loop member 3, the loop member is of stronger construction and provides a more effective bearing surface for the trunnion member than would be the case if a single long slot were formed therein in a manner which would bisect substantially the entire portion of the loop surrounding trunnion.

A modified form of the invention as shown in Figs. 7 and 8, provides a tubular spacer 15' having a curved inner end 15'' for contacting the trunnion 10.

Another modification as shown in Fig. 9 embodies a nut 14' having an integral tubular spacer member 15a which may be formed with either a straight or curved end for contacting either trunnion member 10 or trunnion member 10a.

I claim:

1. In a hose clamp, a flexible band for embracing a hose, means forming on the band a loop member having a pair of opposed openings therein for reception of a bolt, a trunnion member mounted to turn in said loop, having a bolt-receiving opening extended therethrough and registering with said pair of openings; means for restraining axial movement of said trunnion member and permitting relative turning movement between the trunnion member and the loop member, including a pair of projections on said trunnion member, one of said projections extending into one of said openings in said loop, said loop having a groove therein into which the other of said projections is extended, and means on said band for mounting the head of a bolt with the shank of the bolt extensible through said openings in said loop member and trunnion respectively.

2. In a hose clamp, a flexible band for embracing a hose, means forming on the band a loop member having opposed openings therein for reception of a bolt, a trunnion member mounted to turn in said loop, said trunnion member having a bolt-receiving opening extended therethrough in registry with said opposed openings, means for restraining axial movement of said trunnion member and permitting relative turning movement between the trunnion member and the loop member, said means including a projection on one of said members and a groove in the other of said members receiving said projection, said projection engaging said groove at a point between said opposed openings, and means on said band for mounting a bolt thereon for extension through the openings in said loop member and said trunnion member respectively.

3. In a hose clamp, a flexible band for embracing a hose, means forming on the band a loop member having a pair of opposed openings therein for reception of a bolt, a trunnion member mounted to turn in said loop, said trunnion member having a bolt-receiving opening extended therethrough, adapted to register with said pair of openings, portions on said members slidably interengaged between said pair of openings restraining axial movement of said trunnion member and permitting relative turning movement between said members, and means on said band for pivotally mounting a bolt for extension through said openings.

4. In a hose clamp, a flexible band for embracing a hose to be clamped, means at one end of the band forming a loop member having a pair of openings therein, a trunnion member mounted in said loop member for turning movement therein, said trunnion member having a bolt-receiving opening therein adapted to register with said pair of openings, a pair of projections on said trunnion member, said loop member having a portion disposed between said pair of openings, said portion having a groove slidably receiving one of said projections, the other of said projections being movable in one of the openings of said pair, a bolt, and means pivotally mounting said bolt adjacent the other end of said band for extension through said openings.

5. In a hose clamp, a flexible band for embracing a hose to be clamped, means at one end of the band forming a loop having a pair of openings therein, a trunnion mounted in said loop for turning movement therein, said trunnion having a bolt-receiving opening extended therethrough and registering with said pair of openings, a pair of projections on said trunnion, said loop having a portion between said pair of openings engageable by one of said projections to restrain axial movement of said trunnion in said loop, the other of said projections extending into one of the openings of said pair, a bolt, means pivotally mounting the bolt adjacent the other end of said band for extension through the openings in said loop and said trunnion, and means operable on said bolt for clamping the band on a hose, said means including a nut and a tubular spacer extending through the other opening of said pair and contacting said trunnion and said nut.

DON B. KATES.

References Cited in the file of this patent

UNITED STATES PATENTS

| Number | Name | Date |
| --- | --- | --- |
| 991,769 | Catelain | May 9, 1911 |

FOREIGN PATENTS

| Number | Country | Date |
| --- | --- | --- |
| 208,659 | Great Britain | Dec. 27, 1923 |
| 229,073 | Great Britain | Feb. 19, 1925 |